(12) United States Patent
Van Der Bijl

(10) Patent No.: US 7,389,844 B2
(45) Date of Patent: Jun. 24, 2008

(54) HEAVY VEHICLE CHASSIS HAVING LOWERED REAR PORTION

(75) Inventor: Simon H. Van Der Bijl, Deni De Wet Bloemfortein (ZA)

(73) Assignee: Spartan Motors, Inc., Charlotte, MI (US)

( * ) Notice: Subject to any disclaimer, the term of this patent is extended or adjusted under 35 U.S.C. 154(b) by 644 days.

(21) Appl. No.: 10/904,626

(22) Filed: Nov. 19, 2004

(65) Prior Publication Data

US 2006/0108784 A1    May 25, 2006

(51) Int. Cl.
*B62D 21/02* (2006.01)

(52) U.S. Cl. .................. 180/291; 180/312; 280/781; 280/790

(58) Field of Classification Search ............... 180/291, 180/292, 311, 312; 280/781, 785, 789, 790, 280/797, 799, 800; *B62D 21/00, 21/08, 21/02*
See application file for complete search history.

(56) References Cited

U.S. PATENT DOCUMENTS

| | | | |
|---|---|---|---|
| 4,422,685 A | 12/1983 | Bonfilio et al. |
| 4,676,545 A | 6/1987 | Bonfilio et al. |
| 5,236,061 A | 8/1993 | Haupt |
| 5,570,757 A | 11/1996 | Courtwright et al. |
| 5,823,569 A | 10/1998 | Scott |
| 5,833,269 A | 11/1998 | Gastesi |
| 6,022,048 A | 2/2000 | Harshbarger et al. |
| 6,250,410 B1 | 6/2001 | Balestrini et al. |
| 6,398,262 B1 | 6/2002 | Ziech et al. |
| 6,494,285 B1 | 12/2002 | Williams |
| 6,540,285 B2 | 4/2003 | Crean |

FOREIGN PATENT DOCUMENTS

| | | | |
|---|---|---|---|
| DE | 4032823 A1 | | 4/1992 |
| DE | 10154353 A1 | | 5/2002 |
| EP | 0 278 479 A2 | * | 2/1988 |
| GB | 2 158 787 A | * | 11/1985 |
| GB | 2 225 986 A | * | 6/1990 |
| GB | 2 252 090 A | * | 7/1992 |
| JP | 2000-142495 A | * | 5/2002 |
| JP | 2002-356175 A | * | 12/2002 |
| WO | WO 03/018358 A2 | | 3/2003 |

* cited by examiner

*Primary Examiner*—Ruth Ilan
(74) *Attorney, Agent, or Firm*—Foster Swift Collins & Smith, P.C.; Allan O. Maki

(57) ABSTRACT

A motor vehicle main chassis includes left and right main frame rails having extending along opposite lateral sides of the chassis. An extended rear frame member having left and right rear frame rails is disposed below and attached to the main frame rails, the rear frame rails extending horizontally in a plane situated below and parallel to the main frame rails. Left and right intermediate spacer rails are attached, respectively, to a bottom surface of the left and right main frame rails and extend rearwardly of the main frame rails. The left and right rear frame rails may be attached, respectively, to a bottom surface of said left and right intermediate spacer rails and extend rearwardly therefrom.

5 Claims, 6 Drawing Sheets

HEAVY VEHICLE CHASSIS HAVING LOWERED REAR PORTION

FIELD OF THE INVENTION

The present invention relates to a heavy vehicle chassis configuration, and more particularly to a chassis configuration wherein a rear frame segment is situated at an elevation above ground level below that of the main chassis.

BACKGROUND OF THE INVENTION

Heavy vehicles such as buses, motor homes, and the like are often provided with rear mounted engines which are located behind the rear axles. In such heavy vehicles, the chassis supports mechanical components such as the engine, drive train, suspension and braking systems. Such vehicles typically include the chassis, a superstructure, and a body.

The heavy vehicles require heavy engines for propulsion. In recreational vehicle applications, rear engine placement is preferred in order to avoid the extension into the front of the vehicle of a large engine housing as well as the excessive noise to which occupants of the vehicle would be subjected.

Conventional chassis for such vehicles utilize a common rail height from the front of the vehicle to the rear of the vehicle. The rails, commonly located at opposite lateral sides of the vehicle, serve to mount and support the engine, suspension, transmission and cooling package. The height of the rails above ground level is dictated by the height of the vehicle suspension. In such assemblies, the engine may be positioned between the rails. However, such placement causes difficulty in access to the sides of the engine for servicing of components. The height of the engine mounting also requires a higher than desirable floor height within the coach body often requiring the use of steps inside the coach. Accordingly, a need exists for improved chassis designs and configurations for heavy vehicles.

SUMMARY OF THE INVENTION

The present invention provides an improved chassis configuration for heavy vehicles which provides a number of advantages over conventional chassis assemblies. An important aspect of the present invention is the provision of a chassis assembly wherein side rails on each side of the chassis terminate at a point behind the rear or drive axle suspension mounting and are integrally attached to rearwardly extending rails positioned a substantial distance below the height of the main rail assembly.

In accordance with a further aspect of the invention, such lowered rear rails are used to mount the engine, the transmission, the cooling system, and exhaust system.

An important advantage resulting from the invention is improved access to the engine both for vehicle assembly and for subsequent service. In accordance with a related aspect of the invention, the lower rear rail height enables mounting of the engine at an increased height relative to the support rails so that improved visibility of and access to the engine from the lateral sides of the chassis is achieved. In accordance with yet another aspect of the invention, the ability to lower the engine mounting height enables the use of lower coach floor heights in a motor home body. In accordance with another related aspect, the lower floor heights may eliminate the need for steps inside the coach, thus reducing fatigue and improving safety for owners and occupants of the coach.

Yet another aspect and advantage of the invention relates to the reduction of components and materials necessary to attach trailer hitches to the vehicle. The lower chassis rail height, thus, enables mounting of a trailer hitch directly to the frame rails or cross members without additional brackets such as have heretofore been customarily required.

Another aspect of the invention is a simplification of engine attachment to the supporting rails. In accordance with the invention, the engine supports can be designed to reduce the amount of rail flange cutouts required for clearance of engine supports during installation and operation.

In accordance with another embodiment of the invention, the need for a separate rear cross member is eliminated due to the ability to incorporate a cross member into the engine support.

Yet another advantage of the invention is the ability to utilize a mechanical drive system for operation of cooling system fans, by virtue of the fact that the lower rail height provides clearance necessary for fan drive belts used to rotate such fans.

Still another advantage of the invention is the ability to utilize a modular power train package which can be attached to the frame assembly utilizing frame tie plates.

Yet another important advantage of the invention is the ability to assemble a complete power train assembly including engine, transmission, exhaust system, radiator, etc., which can be assembled offline and subsequently attached in a modular fashion to the main chassis assembly.

Briefly, the invention provide a motor vehicle main chassis that includes left and right main frame rails extending along opposite lateral sides of the chassis. An extended rear frame member having left and right rear frame rails is disposed below and attached to the main frame rails, the rear frame rails extending horizontally in a plane situated below and parallel to the main frame rails. Left and right intermediate spacer rails are attached, respectively, to a bottom surface of the left and right main frame rails and extend rearwardly of the main frame rails. The left and right rear frame rails may be attached, respectively, to a bottom surface of said left and right intermediate spacer rails and extend rearwardly therefrom.

BRIEF DESCRIPTION OF THE DRAWINGS

The foregoing features and advantages of the invention as well as other aspects of the invention will become apparent with reference to the detailed description and accompanying drawings wherein.

DETAILED DESCRIPTION OF THE INVENTION

Figure 1:
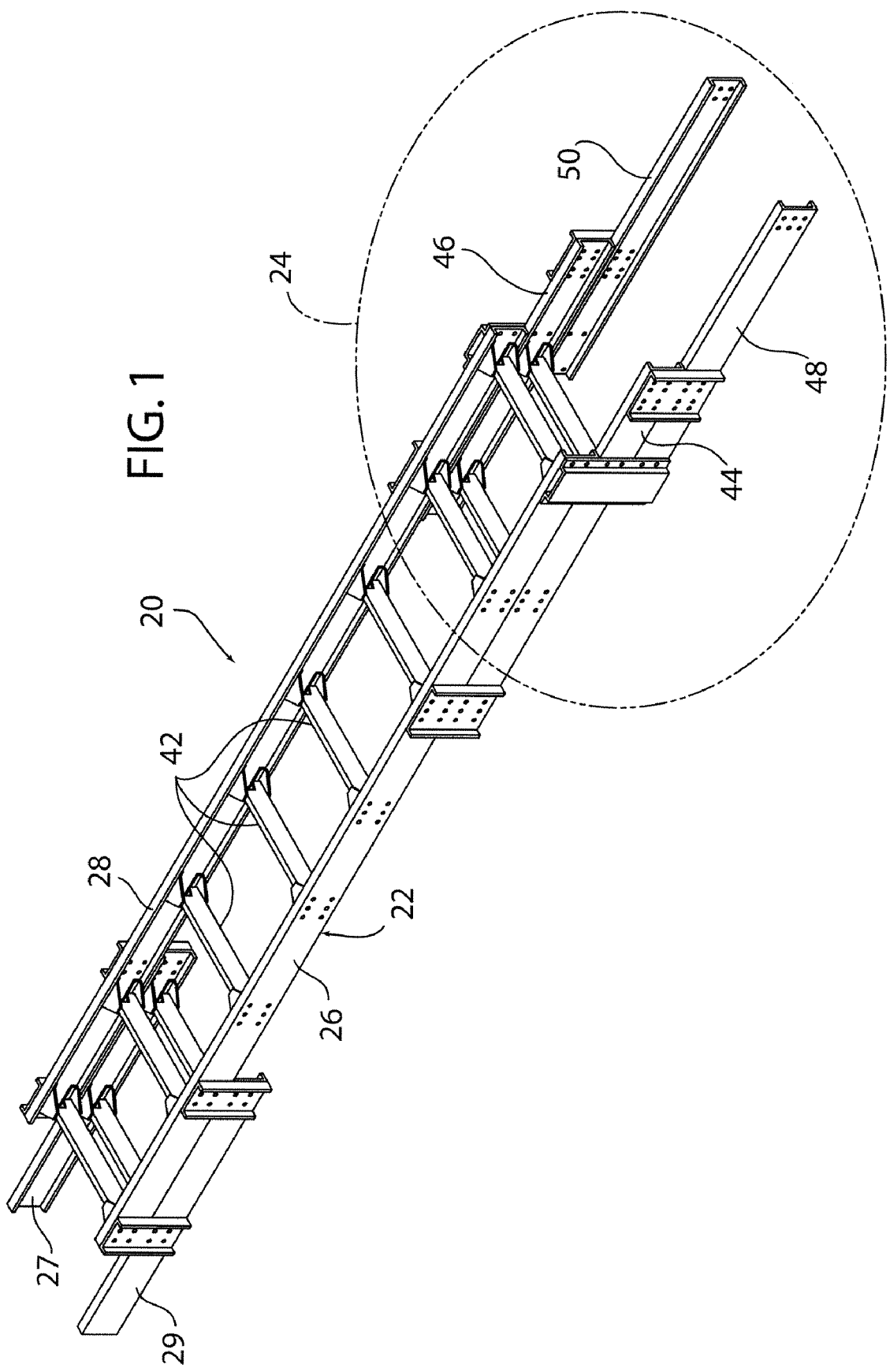
FIG. 1 is an isometric view of a chassis in accordance with the invention.

Referring more particularly to the drawings, FIG. 1 illustrates an embodiment of the invention in the form of a recreational vehicle chassis 20. Chassis 20 includes a main chassis subcomponent 22 and a rear chassis subcomponent 24. The main chassis subcomponent 22 includes two parallel frame rails 26 and 28 that run longitudinally from a point forward of a front axle 30 on which are mounted a set of front wheels 32 and a suspension assembly (not shown). As shown in the drawings, a pair of short rails 27 and 29 may be attached to the bottom surfaces of rails 26 and 28, extending forwardly beyond the forward ends thereof. The front suspension, axle 30 and wheels 32 can then be attached to rails 27 and 29, thereby increasing the road clearance of the vehicle.

Figure 5:
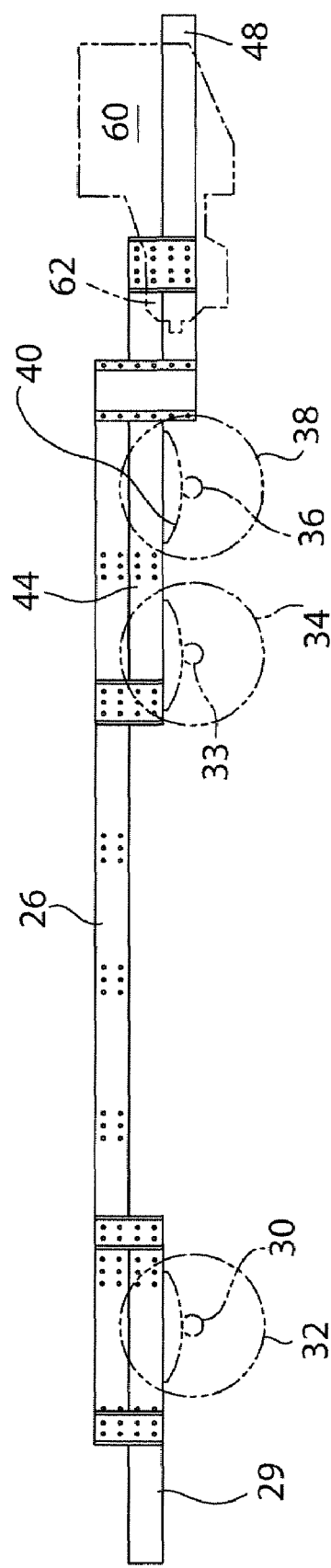
FIG. 5 is a side elevational view of a chassis in accordance with an embodiment of the invention showing the approximate location of an engine and wheels on a vehicle which incorporates the chassis; and, FIG. 6 is a fragmentary side view of the rear section of the chassis of FIG. 5.
Figure 6:
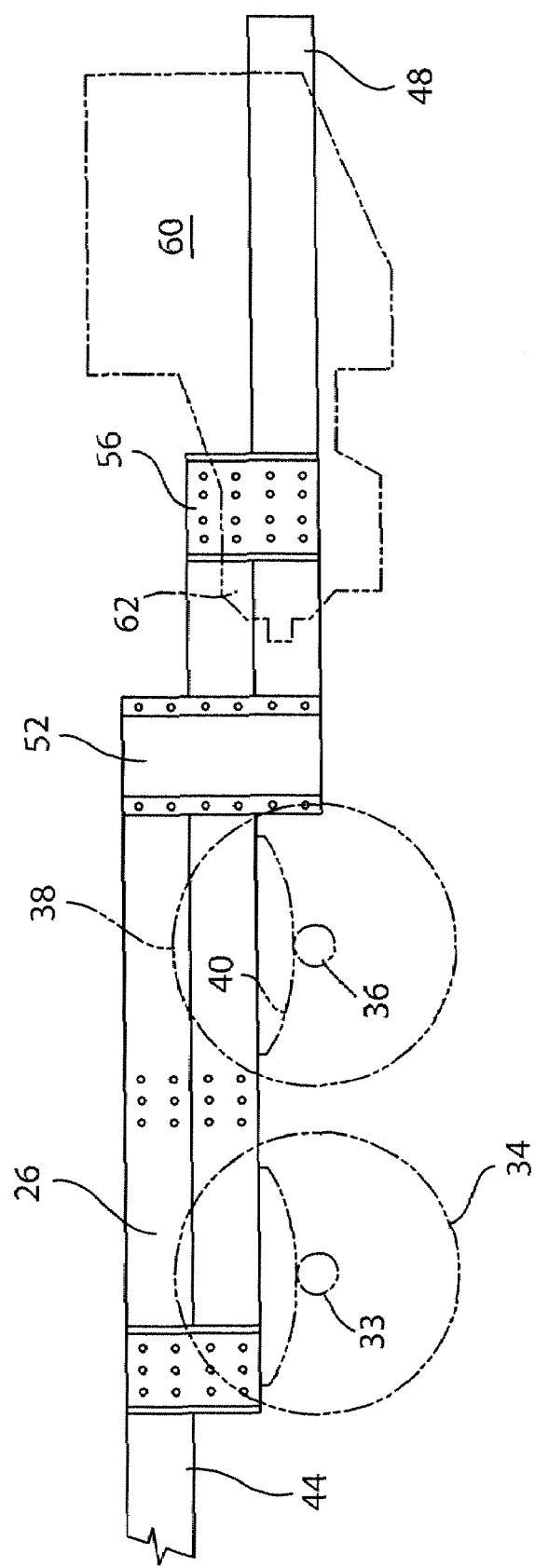

Rails 26 and 28 run rearwardly to a point to the rear of a rear axle 36 (FIG. 5) on which are mounted a set of rear wheels 38 and a suspension assembly 40. In the embodiment of FIGS. 5 and 6 an intermediate axle 33 and set of wheels 34 are also optionally included. The positions of the front and rear axles 30, 36 and intermediate axle 33 along the frame rails 26 and 28 are dictated by engineering principles, which are in turn governed by the length, gross vehicle weight and suspension requirements of a particular vehicle.

Figure 2:
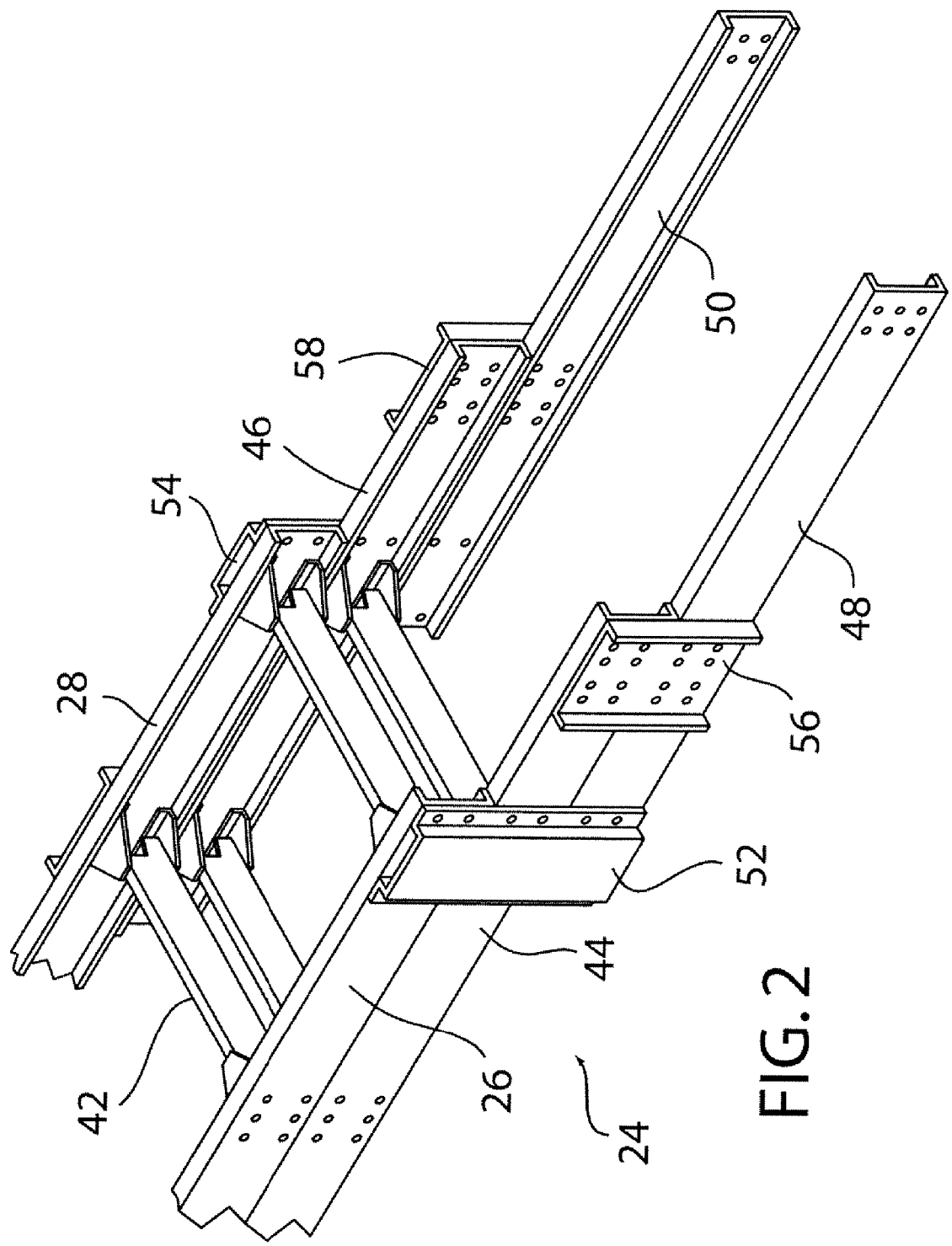
FIG. 2 is a fragmentary isometric view illustrating the rear section of the chassis of FIG. 1.
Figure 3:
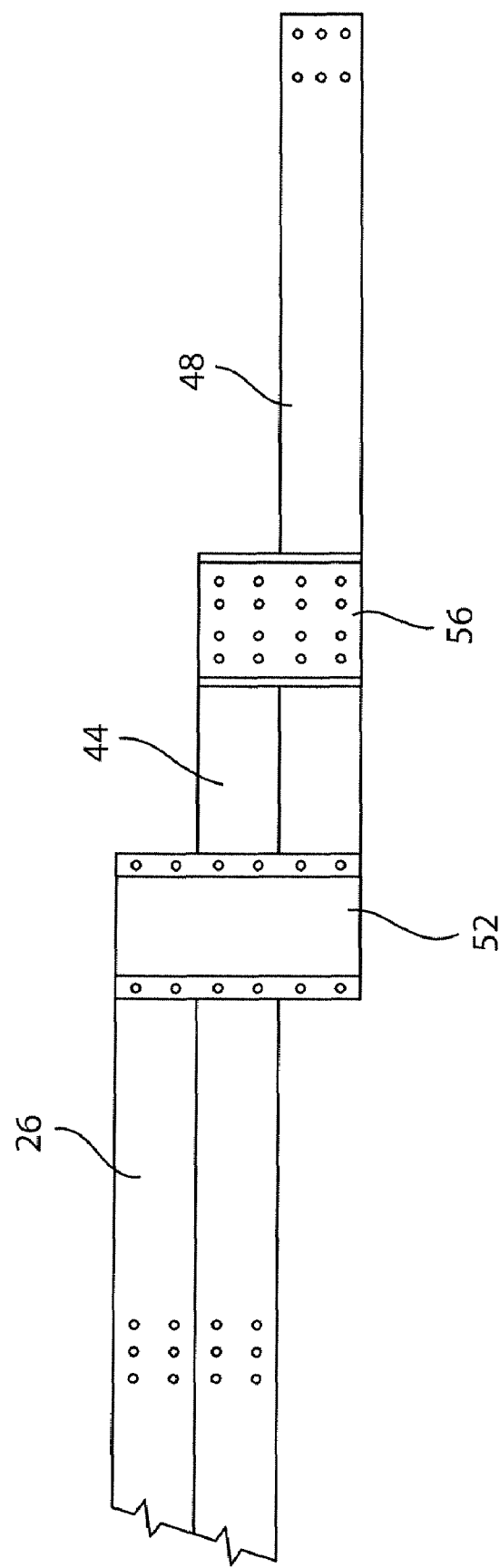
FIG. 3 is a fragmentary side view of the rear section shown in FIG. 2.
Figure 4:
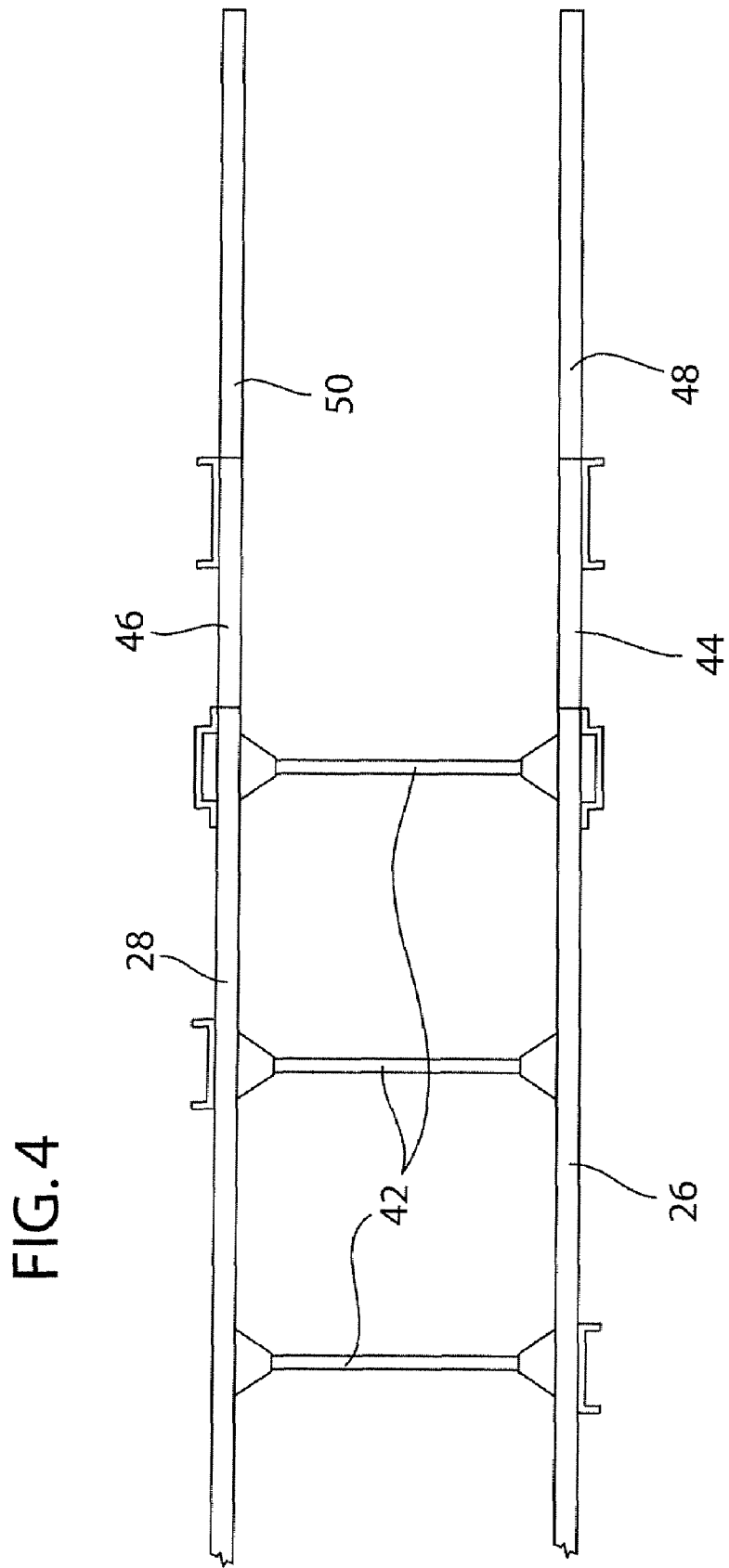
FIG. 4 is a fragmentary top view showing the rear section of FIG. 2.

An intermediate spacer rail 44 is attached to the bottom surface of rail 26 and extends rearwardly beyond the rear end of rail 26. Lower rear rail 48 is, in turn, attached to the bottom surface of intermediate rail 44. Vertical members 52 and 56 serve to connect and stabilize the rail members 26, 44 and 48 in their assembled positions as shown. A similar set of horizontal rails 28, 46 and 50 on the opposite lateral side of the chassis 20 are similarly tied together in their assembled positions by vertical member 54 and 58 (see FIG. 2).

The main frame rails 26 and 28 are preferably made of steel approximately 20.32 centimeters to 25.40 centimeters (8 to 10 inches) in height. Conventionally at least two intermediate cross members 42 are affixed to the respective rails 26 and 28 at selected locations and define the width of the main chassis subcomponent 22.

As seen in FIGS. 5 and 6, mounting of the engine 60 and transmission 62 enables improved access to the lateral sides of engine 60. Such positioning avoids interference with side access by the supporting longitudinal rails to the extent that would occur if the engine were to be mounted directly on a rearward projection of longitudinal rails 26 and 28 as viewed in FIGS. 5 and 6.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

What is claimed is:

1. A motor vehicle comprising:
   a main chassis component including left and right main frame rails having forward and rearward ends extending horizontally along a longitudinal axis of the chassis said rails being adjacent to opposite lateral sides of the chassis;
   an extended rear frame component having left and right rear frame rails each having forward ends disposed below and attached, respectively, to said left and right main frame rails, said rear frame rails extending horizontally in a plane situated below and parallel to said main frame rails;
   the main chassis component being attached perpendicularly to a front axle and a rear axle;
   left and right intermediate spacer rails attached, respectively, to a bottom surface of said left and right main frame rails, each spacer rail extending from a point located forwardly of the rear axle and extending rearwardly beyond the rearward ends of said main frame rails;
   said extended left and right rear frame rails each being attached, respectively to a bottom surface of said left and right intermediate spacer rails and extending horizontally in a plane situated below and parallel thereto; and
   wherein an engine is adapted to be supported between said rear frame rails with a longitudinal axis located in a plane parallel to said longitudinal axis of said chassis.

2. A motor vehicle according to claim 1 wherein left and right main rails, intermediate spacer rails and lower rails are all attached to each other by vertical members.

3. A motor vehicle according to claim 1 wherein a transmission is adapted to connect said engine to said rear axle.

4. A motor vehicle comprising:
   a chassis including left and right main frame rails having forward and rearward ends extending horizontally along a longitudinal axis of the chassis said rails being adjacent to opposite lateral sides of the chassis;
   the chassis being attached perpendicularly to a front axle and a rear axle;
   spacer members connecting said left and right main frame rails thereby defining the width of said chassis;
   left and right intermediate spacer rails attached, respectively, to a bottom surface of said left and right main frame rails and each extending from a point located forwardly of the rear axle and extending rearwardly beyond the rearward ends of said main frame rails;
   an extended rear frame member having left and right rear frame rails each having forward ends disposed below and attached, respectively, to said left and right intermediate spacer rails, said rear frame rails extending horizontally in a plane situated below and parallel to said main frame rails, said left and right rear frame rails being adapted to support an engine there between with a longitudinal axis thereof located in a plane parallel to said longitudinal axis of said chassis.

5. A motor vehicle according to claim 4 wherein said left and right rear frame rails are attached, respectively, to a bottom surface of said left and right intermediate spacer rails and extend rearwardly from the rearward ends of intermediate spacer rails and said main frame rails.

* * * * *